Jan. 1, 1946.   O. DENYS   2,392,124
MOLECULAR CENTRIFUGAL PROCESS AND APPARATUS
Filed Aug. 14, 1943   3 Sheets-Sheet 1
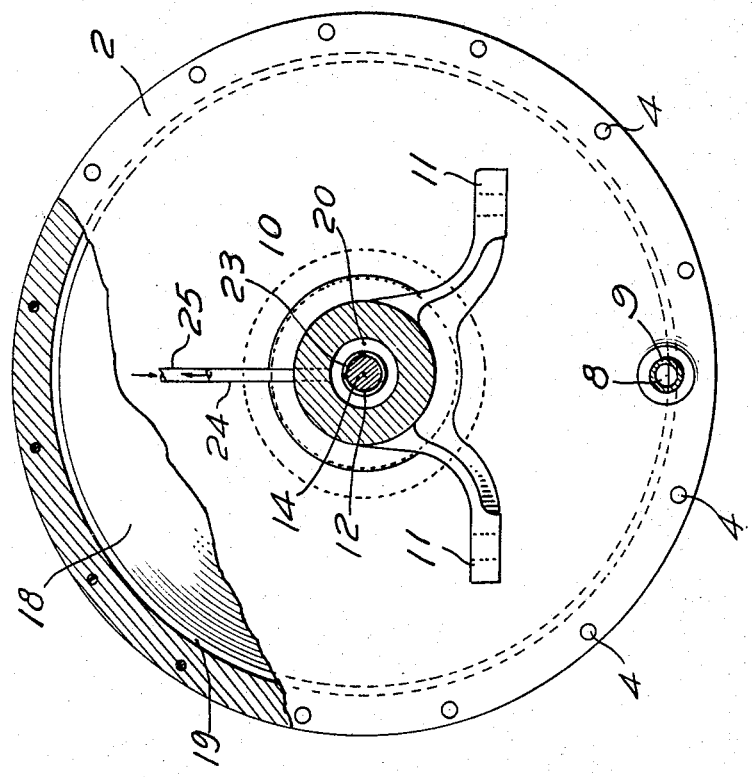
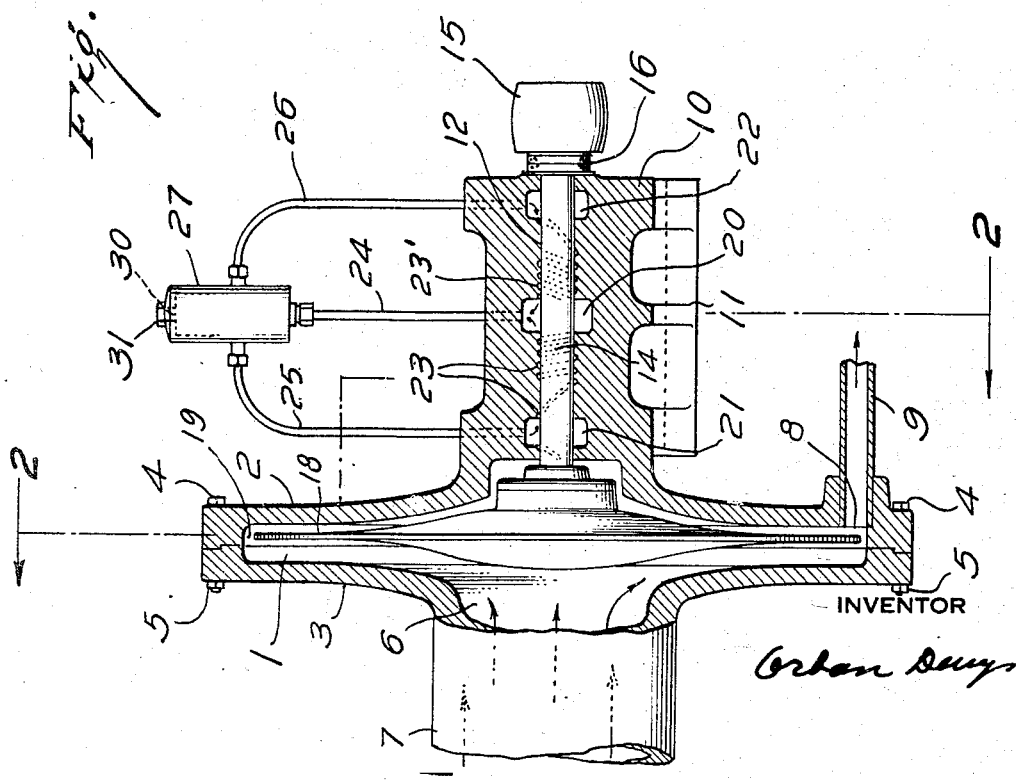
INVENTOR
Orban Denys INVENTOR
Orban Denys Patented Jan. 1, 1946

2,392,124

UNITED STATES PATENT OFFICE 2,392,124

MOLECULAR CENTRIFUGAL PROCESS AND APPARATUS

Orban Denys, Brooklyn, N. Y., assignor to Distillation Products, Inc., Rochester, N. Y., a corporation of Delaware Application August 14, 1943, Serial No. 498,693

6 Claims. (Cl. 183—2)

The invention is an improvement in molecular centrifugal apparatus. It has for its primary object the provision of a device for concentrating the lighter molecules in a gaseous mixture of different molecular weights and the accessorial object of providing a more practical and simpler rotary molecular vacuum pump. The former being used in conjunction with the latter.

The term molecular weights as used herein, has to be interpreted in its absolute meaning, for instance, a substance composed of "$n$" isotopes has in my meaning "$n$" different molecular weights.

The process of the primary invention, namely the molecular centrifugal gas concentrator, makes possible the concentration by mechanical means of the gas of the lightest molecular weight in a gaseous mixture of different molecular weights; this process if repeated a sufficient number of times will ultimately achieve the complete separation of the lightest gas from a gaseous mixture. This process is adaptable to vapors, thus making fractionation of a distilland at very low pressures possible. The process is further adaptable to the concentration and ultimately to the separation of the isotopes of elements and their compounds which can be vaporized at a working temperature at very low pressure.

In order to make these inventions more easily understood, a preliminary illustration of the principles applied to both inventions is useful. Let us consider a horizontal passage of rectangular cross section containing a gas at such pressure that the mean free path of its molecules is large compared to the transverse dimension of said passage and that one wall of said passage is moving in its own plane in a direction from left to right, then the molecules striking the moving wall will acquire a velocity having a tangential component equal to that of the moving wall and a difference of pressure will be established between both ends of the passage; the high pressure side being at the right end of the passage.

It can be deduced from the kinetic theory of gases that the above mentioned difference of pressure is a function of the velocity of the moving wall and the molecular velocity of the gas, the latter in turn being a function of the molecular weight of the gas and its temperature; the lighter molecules at a given temperature having a greater molecular velocity than the heavier molecules at the same temperature. It is obvious that the molecules of a gas with a greater molecular velocity—hence a gas with a smaller molecular weight—will strike the moving wall more often than a gas with a greater molecular weight and consequently will have a tendency of moving faster in the direction of this wall than the heavier gas.

Still referring to the passage with its moving wall, let us assume that the velocity of said wall can be regulated, that a vacuum pump is connected at its left end while from the right end a gaseous mixture of two different molecular weights, due to the action of the pump, is moving from right to left at a constant velocity; moving the wall at a relatively slow velocity will slow down the flow of the mixture, increasing this velocity appreciably might make the flow negative; between these two velocities there is an optimum velocity which has for effect to allow the heavier molecules, although their flow is retarded, to reach the vacuum pump's inlet while the lighter molecules, striking more often against the wall are pushed back toward the passage's inlet. Thus, according to this theory, we would have an accumulation of lighter molecules at the right end of the channel, while the heavier molecules are pumped out. It is on these principles that the primary invention, the molecular centrifugal gas concentrator is based.

It will be apparent from these two illustrations that there is an analogy between the two processes and their apparatuses, the one being a modification of the other. Both use a moving wall and as will be explained further the one is not only accessorial but also complemental to the other; they mutually contribute to produce a single result, namely, the concentration of the lighter gas in a mixture of gases.

Two practical applications of the example of the rectangular passage and its moving wall are illustrated in the accompanying drawings in which:

Figure 1 represents a vertical section through one modification of the apparatus, the molecular centrifugal vacuum pump which is used in conjunction with the molecular centrifugal gas concentrator, it shows the details of the lubricating system.

Figure 2 is an elevational view, partly in section, along the lines 2—2 of Figure 1.

Figure 3:
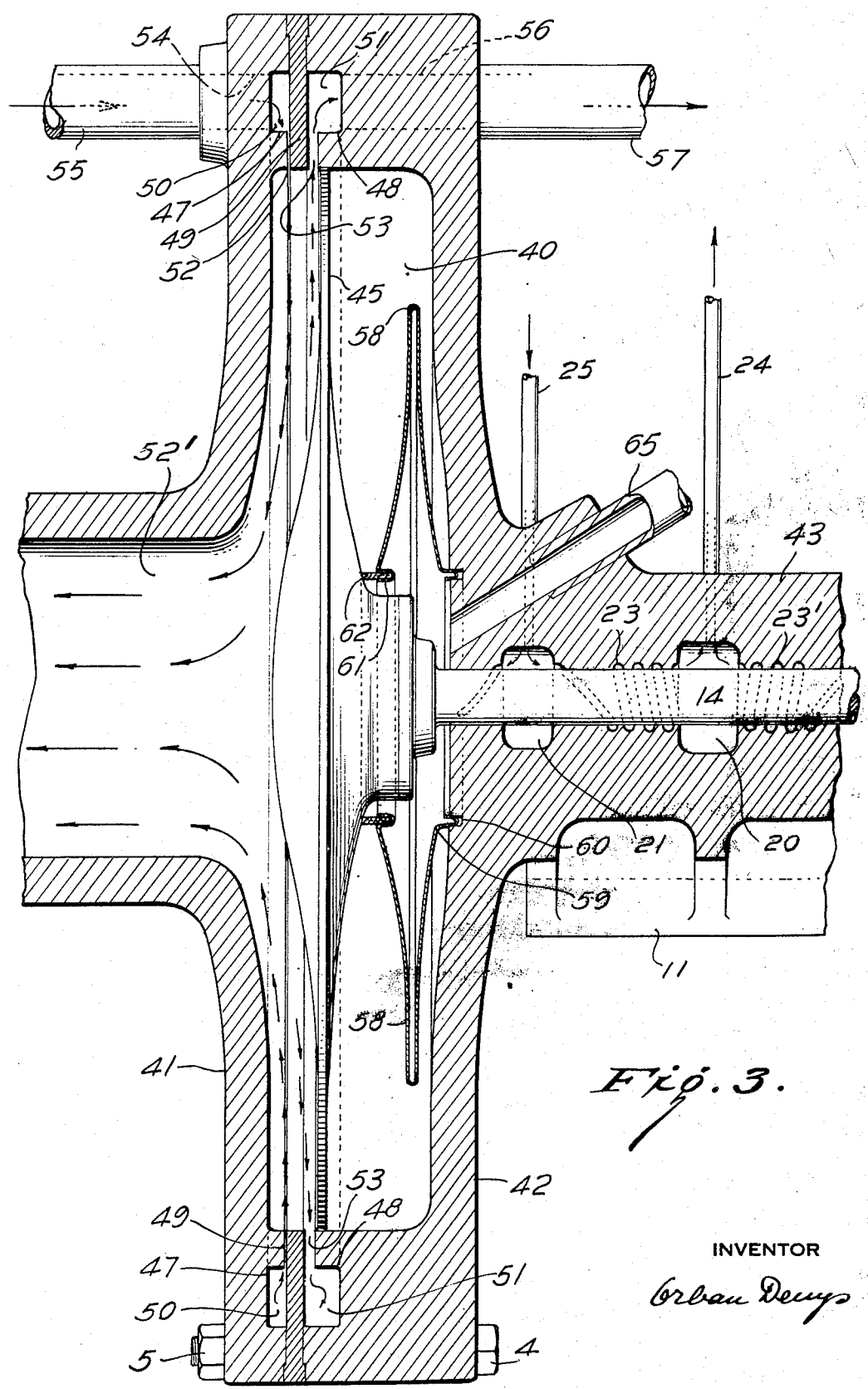
Figure 3 is a vertical section of a further modification; the molecular centrifugal gas concentrator proper.

With reference to Figures 1 and 2, it will be seen that the apparatus comprises a cylindrical chamber 1 having a diameter which greatly exceeds its height. This chamber is formed by two casings, which may be designated as a bearing-section 2 and a face-plate 3, fastened together by any suitable means such as the bolts 4 and nuts 5. Centered in face-plate 3, is a large opening 6 and a conduit 7 which serves as a gas or a vapor inlet. Bearing-section 2 has a smaller outlet 8 near the outer periphery of chamber 1 and a conduit 9 which serves to carry the flow from the chamber and can be connected to a preliminary vacuum pump or condensation means or both.

Centrally located on the outer face of bearing section 2 is a projection 10 which in turn carries a pair of lugs 11 by which the apparatus may be mounted to any suitable support, which not forming part of the present invention is not shown. Projection 10, in turn, is centrally pierced by the bore 12 which serves as a bearing for shaft 14. On the outer extremity of shaft 14 is mounted a driving pulley 15 which is fastened to the shaft by any suitable means and is spaced from the extreme end of the projection 10, by means of the ball bearing 16.

Inside chamber 1, on the other end of shaft 14 and mounted for rotation within chamber 1 is a large disk 18. This disk is made of such a form that the stress at any point between the center and the rim is constant. Its profile is concavo-convex. It is called a disk of uniform strength. As further illustration it can be said that this disk is so designed that when rotating at its operating speed its strength at any point is safely sufficient to overcome the centrifugal stresses at its periphery; in other words it is the theoretical lightest disk that can be practically and safely rotated at a given speed. The diameter of disk 18 is such as to provide a substantial clearance 19 between its peripheral edge and the inner wall of chamber 1. Disk 18 in Figure 1 is shown as made integral with the shaft 14. However, it may be separately made and fastened to the shaft in any adequate manner. It is to be noted that a hole in the disk will considerably weaken it unless its cross section is greatly enlarged toward its center and this complicates unnecessarily the design of the disk.

Figure 1 also shows the connection for the lubricating system. The bore 12 in bearing-section 2 is essentially a straight, cylindrical opening. About midway its length, an enlargement 20 is provided to serve as an oil well. Near each end of bore 12, additional enlargements 21 and 22 are provided, also to serve as oil wells. Opposing helical grooved passages 23 and 23' in the body of the bearing section serve to connect the central well 20 with the end wells 21 and 22 respectively.

Three, aligned, small conduits 24, 25 and 26 serve to connect oil wells 20, 21 and 22 respectively with an oil reservoir 27. The internal diameter of these conduits is such as to insure an appropriate rate of flow of oil; they can furthermore be provided advantageously with suitable flow regulating devices. These conduits also serve as a support for the reservoir. Shaft 14 is very carefully fitted to the bearing surfaces of bore 12, allowing the least possible practical tolerance. Rotation of shaft 14 in bore 12 causes oil to move from wells 21 and 22 to the center well 20, up through conduit 24 to reservoir 27 and thence back through conduits 25 and 26 to the wells 21 and 22. The purpose of this lubricating device is three fold. First it provides a continuously cooled lubricant to the bearing and its shaft, it also insures against the oil being forced past its bearing and it also is a vacuum seal. Preferably, helical grooves 23 and 23' extend somewhat beyond the openings 21 and 22 in order to insure proper operation. Makeup oil, to replenish losses during operation, may be added through an opening 30 normally closed by cap 31, in the top of reservoir 27. This cap can also be advantageously replaced with evacuating means which have for the purpose to evacuate gases slowly dissolving in the oil.

With reference to the modification shown in Figure 3, it will be seen that the apparatus like that in Figures 1 and 2, comprises an enclosed cylindrical chamber 40 made up of a face-plate 41 and a bearing-casing 42. Face plate 41 has a large central opening 52'. Bearing casing 42 carries a projection 43 to provide the bearing proper. A lubricating system similar to that of Figure 1 is mounted on projection 43. A shaft 14 is mounted therein as in Figure 1 and a rotatable disk 45 is mounted thereon for rotation within the chamber 40. Otherwise, the departure from the design of Figure 1 is quite complete.

Both face-plate 41 and bearing-casing 42 are provided with opposed, and substantially rectangular in cross-section, annular projections or ridges 47 and 48, respectively, near their outer peripheries. In addition to casings 41 and 42, a third plate or partition in the form of a ring 49, is used to enclose the cylindrical space 40. Thus, when casings 41 and 42 are assembled with the intermediate ring 49 to divide the chamber 40, two additional hollow spaces comprising the annular chambers 50 and 51 are formed in the body of the apparatus. Face-plate 41 is machined on its inner surface to provide a very narrow communicating passage 52 between space 40 and 50. Similarly, bearing section 42 is machined to provide a somewhat larger annular slot connecting spaces 40 and 51. The relatively narrow opening 52 near the outer periphery of plate 41 serves to connect space 50 with inlet 54 and conduit 55 and the similarly formed passageway or opening 53 connects space 51 to outlet 56 and conduit 57.

Figure 4:
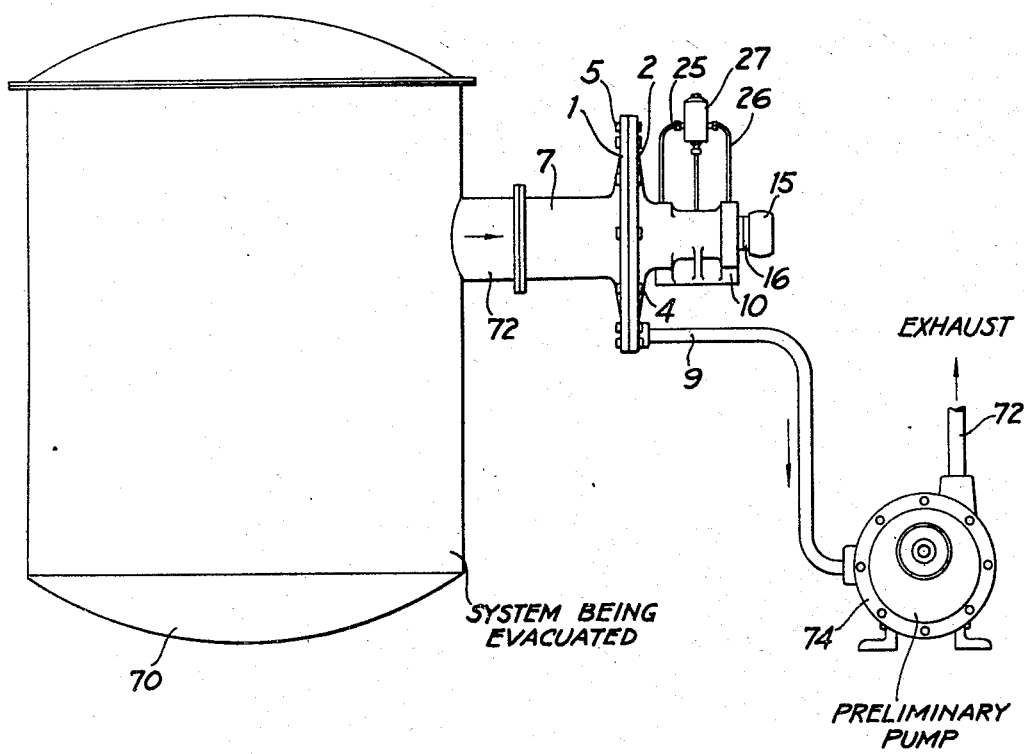
Fig. 4 is an elevation of a complete apparatus showing the receptacle being evacuated by my improved molecular pump and the preliminary backing pump.

One feature should be noted. Clearance between the outer periphery of disk 45 and the inner wall of chamber 40 is kept at an absolute practical minimum. This is in contrast with the clearance between disk 14 and the wall of the cylindrical chamber 1, which has to be quite substantial. The peripheral edge of disk 45 is maintained in the desired relation to slots 52 and 53 by means of a ball bearing not shown here since its function and location are identical to bearing 16 of Fig. 1. Lateral moving of the disk and shaft assembly in the direction of the bearing section 2 is prevented by the atmospheric pressure on the shaft and pulley, this pressure is positive when the apparatus is in operation on account of the high vacuum prevailing in the cylindrical chamber. A metallic, bellows diaphragm 58 is mounted between disk 45 and the inner face of bearing section 42. One face of the bellows is mounted on the bearing-casing by means of an outwardly projecting circular ridge 59 which fits snugly into an annular groove 60 in the inner face of casing 42. The opposite face of bellows 58 carries a groove 61 made by suitably bending the material of the diaphragm. Mounted in groove 61 is a bearing strip 62 in the form of a ring made of a non-abrasive and low vapor pressure substance such as evacuated graphite or other like material. This ring shaped bearing strip bears against the disk 45, thus the space within the bellows diaphragm 58 is substantially sealed from the cylindrical chamber 40. This bellows diaphragm 58 acts as a spring and its function is similar to the springs which keep carbon brushes in contact with the communtator in some electric motors. In this manner, the wearing of the bearing strip 62 does not prevent it from remaining in contact with the rotating disc and thus gases that might leak through the bearing which contains shaft 14 are prevented from leaking into chamber 40 and contaminating the gases being processed. Bearing strip 62 may be replaced from time to time as may be required. A conduit 65 communicates with bearing-casing 42 at an oblique angle to the drive shaft and provides a connection between the inner space within the bellows diaphragm and a suitable evacuating means, which not forming part of the present invention is not shown. Referring to Fig. 4, numeral 70 designates a system to be evacuated, to which is connected a conduit 72 which is, in turn, connected to the intake conduit 7 of my improved molecular pump. Numeral 74 designates a preliminary backing pump, the intake of which is connected to conduit 9 leading to the exhaust side of my improved molecular pump. This preliminary pump is capable of producing a relatively high vacuum of the order of .01 mm. and preferably less. Numeral 72 designates the exhaust side of the preliminary pump 74.

In operation the molecular centrifugal pump of Figure 1 is connected to the molecular centrifugal gas concentrator of Figure 3 by connecting the inlet 6 of Figure 1 to outlet 52' of Figure 3, condensation means or a preliminary vacuum pump or both are connected in series to the conduit 9 of Figure 1, evacuating means are connected to conduit 65 of Figure 3, condensation means or vacuum pump or both are connected in series to conduit 57, the respective disks of both apparatuses are made to rotate and the gaseous or vaporous mixture is allowed to pass from conduit 55 into the annular chamber 50 and narrow slot 52 from which it effuses into the chamber 40. The rate at which the mixture effuses is controlled by its pressure in the annular chamber 50. This pressure can be regulated at the source of supply by any suitable means. The pressure of the effusing mixture should be such that the mean free path of its molecules is greater than the distance between the inner side of the face plate 41 and the face of the disk opposite to it. In other words there is a pressure it cannot exceed for the proper working of the process. This pressure is in the neighborhood of 1/1000 of 1 millimeter absolute. The molecules in the cylindrical chamber 40 on the average strike the moving disk more often than they collide among themselves, the molecules striking the moving disk are given a velocity having a tangential component this action gives them a tendency to travel toward the periphery, where they can escape through annular chamber 51, opening 56 and conduit 57, they are also urged to travel toward the center through opening 52' due to the powerful action of the vacuum pump of Figure 1. They cannot possibly escape through the narrow slot 52 (except for an almost infinitesimal portion that might diffuse in that channel) for the pressure prevailing there is higher than in the chamber 40. Obviously there will be a flow through both openings 56 and 52', but the molecules cannot possibly reach opening 52' without striking against the rotating disk, the action of which tends to make them travel toward the periphery and passage 53 and since the lighter molecules strike the disc more often than the heavier ones, there is a greater probability of the lighter molecules reaching outlet 56 than there is for the heavier ones which, on account of their greater molecular weight and lower velocity, strike the rotating disc less often and consequently have a lesser tendency to travel toward the periphery.

It will be appreciated that by increasing the pressure of the gaseous mixture effusing through slot 52 and decreasing the capacity of the pump or condenser connected at 57 the volume of flow toward 52' will be increased providing of course that the pump connected to it can take care of this increased flow. On the other hand an increase of flow toward the opening 56 can be produced by increasing the capacity of the pump or condenser at 57. It will be apparent that an increase in flow in the direction of the opening 52' means a greater tendency of the molecules to travel in the direction opposite to the velocity having a tangential component given to the molecules by them striking against the moving disk. By varying the pressure of the effusing mixture and varying the capacity of the pump or condenser at 57 the tendency of the molecules to travel either toward the periphery and outlet 57 or in the opposite direction toward the outlet 52' can thus be regulated and an optimum pressure or rate of feeding the gaseous mixture through slot 52, that pressure or rate of feeding which would pass the greatest percentage of lighter molecules through conduit 57 can be ascertained experimentally. When this optimum rate of feeding has been ascertained the system is ready for continuous operation and a constant flow of a concentration of lighter molecules can be continuously collected or condensed at the conduit 57 while a concentration of the heavier molecules can be collected or condensed at conduit 9 of the pump of Figure 1.

During the operation of the apparatus illustrated in Fig. 4 gases from system 70 diffuse into the pump casing 1 through conduits 72 and 7. The gases are forced into conduit 9 by the pumping action described above in connection with Figs. 1 and 2. The pumped gases are then taken into the intake side of pump 74 and are exhausted through conduit 72 by the action of the pump 74. As a concentration of heavier molecules leaves the outlet 52' of Figure 3 they enter the opening 6 of Figure 1 where they strike against the rotating disk 18 which action imparts to them a velocity having a tangential component which produces a gradual movement of the molecules towards the disk's periphery; the general course followed by the molecules is that of a spiral. The molecules at the periphery accumulate in a crowded condition—hence at a higher pressure—from where they can be collected or condensed by means connected to conduit 9.

A requisite condition for the proper working of both processes concerns the machining of both disks and their respective face plates: the normal drawn from any point of the disk should also be a normal to a point on the inner side of the disk's respective face plate, except when this normal corresponds with the opening on the face-plate. A deviation from this rule apparently gives erratic and in some cases negative results.

Another requisite rule is the velocity of the respective disks. It should be as high as practically possible, hence the rational shape of the disks used. The maximum velocity at which a disk of the illustrated design can safely rotate depends of course on the material used on the diameter of the disk. For a disk made of a good nickel steel and of a 50 centimeter diameter a peripheral speed of 600 meters a second is quite feasible. Disks of substantially smaller diameter are apparently not satisfactory on account of their relatively short radius which decreases the distance the molecules have to travel either toward the periphery or toward the center.

Referring to the molecular centrifugal gas concentrator, I believe it to be more efficient than any other known device such as super centrifuges or diffusion processes.

Referring to the molecular centrifugal pump I believe it to be a more rational rotary molecular pump than any other known rotary molecular pump. It has the advantage that its rotor or disk does not have to fit closely against the wall of its casing thus allowing it to rotate at the maximum speed the centrifugal stress will stand, furthermore the design of its disk enabling it to withstand the maximum centrifugal stresses for a given rim thickness cannot be improved upon, and it is the first time a disk of such design is applied to molecular centrifugal machines.

The above descriptions are given by way of examples only and many modifications can be made without departing from the scope of the invention.

I claim as my invention:

1. A molecular gas separating apparatus comprising a stationary housing, said housing including a peripheral wall and cooperating front wall, the front wall having an axially disposed outlet opening, a rotatable disk parallel to said outlet opening, a rotatable disk parallel to said front wall and extending into closely fitting relationship with said peripheral wall, the thickness of said disc being proportionate at all points to the centrifugal stresses to which said disc is subjected at said points when rotating at its operating speed, said disk and front wall defining a separating chamber of small constant transverse dimension, the peripheral wall being provided with an inlet slot adjacent the front wall and an outlet slot adjacent the face of said disk, each of said slots extending substantially throughout the circumference of the chamber, means for rotating said disk, means for supplying a gaseous mixture to said inlet slot, means for withdrawing gas enriched in one of the constituents from said outlet slot and means for withdrawing gas enriched in another and different constituent from said axial outlet opening.

2. A molecular centrifugal process for exhausting a vacuum system to a pressure substantially below 1/100 mm. Hg, comprising the preliminary evacuation of the system to a pressure below 1/100 mm. Hg, the effusion of the residual gas molecules of the vacuum system into an innerly cylindrical enclosure, their free centrifugal travelling between two opposing walls of said enclosure, their simultaneous back and forth collisions with said walls, the average distance travelled by these molecules between two such collisions being constant and at least of the same magnitude as the mean free path of the gases being treated and continuously withdrawing thus treated gases.

3. A molecular apparatus comprising a stationary housing, said housing including a cooperating wall having an axially disposed inlet opening, a rotatable disc positioned in the housing so that the inside wall of the housing and the surface of the disc are approximately parallel, both said inside wall and the surface of the disc being smooth and being separated from each other by a distance of less than about the mean free path of the gases being pumped, means for rotating said disc and an outlet means for gases, positioned peripherally with respect to the disc.

4. A molecular pump comprising a stationary housing, said housing including a cooperating wall having an axially disposed inlet opening, a rotatable disc decreasing in thickness in proportion to the centrifugal stresses to which it is subjected as the edge of the disc is approached and positioned in the housing so that the inside wall of the housing and the surface of the disc are approximately parallel, both said inside wall and the surface of the disc being smooth and being separated from each other by a distance of less than about the mean free path of the gases being pumped, means for rotating said disc and an outlet means for compressing gases positioned peripherally with respect to the disc.

5. A molecular centrifugal process of exhaustion which comprises the preliminary evacuation of the system to a pressure below about .001 mm. Hg, introducing the residual gases in the system after the preliminary exhaustion into a space between two opposing approximately parallel and smooth walls which walls are separated by a distance of less than approximately the mean free path of the residual gases in the system and withdrawing gases after they have passed between the said opposing walls.

6. A molecular gas separating apparatus comprising a stationary housing including a peripheral wall and a cooperating front wall, an axially disposed outlet opening in the front wall, a rotatable disc positioned within the housing so that it is approximately parallel with the cooperating front wall which disc is of such diameter that it extends into close fitting relationship with the peripheral wall and the thickness of the disc being proportionate at all points to the centrifugal stresses to which said disc is subjected at said points when rotating at its operating speed, said disc and front wall forming a separating chamber of small and approximately constant transverse dimension, the peripheral wall being provided with an inlet adjacent the front wall for gases to be separated and an outlet for separated gas adjacent the face of the disc, means for rotating the disc, means for supplying a gaseous mixture to the inlet for gases to be separated, means for withdrawing gases enriched in one of the components from the outlet at the peripheral wall and means for withdrawing gas enriched in another and different component from the said axial outlet opening.

ORBAN DENYS.